United States Patent
Dudding et al.

(10) Patent No.: US 8,038,163 B2
(45) Date of Patent: *Oct. 18, 2011

(54) LEADING AND TRAILING ARM SUSPENSIONS HAVING A FULLY INTEGRATED ARM

(75) Inventors: Ashley Thomas Dudding, Yorkville, IL (US); Rodolfo Rosales, Jr., Naperville, IL (US); Jerome Lim Cortez, Tinley Park, IL (US); Jerry Michael Lovett, Joliet, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,784

(22) Filed: Apr. 1, 2010

(65) Prior Publication Data

US 2010/0187789 A1  Jul. 29, 2010

Related U.S. Application Data

(63) Continuation of application No. 11/693,362, filed on Mar. 29, 2007, now Pat. No. 7,690,660.

(51) Int. Cl.
*B60G 3/12* (2006.01)
(52) U.S. Cl. .... 280/124.128; 280/124.116; 280/124.153
(58) Field of Classification Search ........... 280/124.116, 280/124.128, 124.153
See application file for complete search history.

(56) References Cited

U.S. PATENT DOCUMENTS

| | | | |
|---|---|---|---|
| 1,200,305 A | 10/1916 | Brush | |
| 1,823,158 A | 9/1931 | Spatta et al. | |
| 1,899,347 A | 2/1933 | Spatta et al. | |
| 1,924,984 A | 8/1933 | Fageol | |
| 2,080,123 A | 5/1937 | Francis | |
| 2,929,618 A | 3/1960 | Hutchens | |
| 3,195,876 A | 7/1965 | Tea | |
| 3,250,546 A | 5/1966 | Allison | |
| 3,510,149 A | 5/1970 | Raidel | |
| 3,602,523 A | 8/1971 | Poulos | |
| 3,612,572 A | 10/1971 | Raidel | |
| 3,767,222 A | 10/1973 | Willetts | |
| 3,895,819 A | 7/1975 | Willetts | |
| 4,322,061 A | 3/1982 | Masser | |

(Continued)

FOREIGN PATENT DOCUMENTS

EP   0940322 A1   9/1999

(Continued)

OTHER PUBLICATIONS

ArvinMeritor RideStar RAL Front Air Suspension, 2003 Mid-America Trucking Show, circa 2003.

(Continued)

*Primary Examiner* — Eric Culbreth
*Assistant Examiner* — Nicole Verley
(74) *Attorney, Agent, or Firm* — Cook Alex Ltd.

(57) ABSTRACT

A leading or trailing arm vehicle suspension system comprised of a fabricated vehicle axle and a fully integrated beam casting providing bending stiffness to control axle windup and longitudinal stiffness to control axle position is disclosed. The beam casting is attached to the vehicle axle with a thru-bolt connection. The beam casting includes rack and pinion mounting attachment holes and also includes other built-in features providing efficient transfer of loads into the vehicle axle.

18 Claims, 7 Drawing Sheets

U.S. PATENT DOCUMENTS

| | | | |
|---|---|---|---|
| 4,519,590 A | 5/1985 | Wells | |
| 4,630,804 A | 12/1986 | Fesko | |
| 4,684,110 A | 8/1987 | Sale et al. | |
| 4,895,350 A | 1/1990 | Schoof et al. | |
| 4,902,035 A | 2/1990 | Raidel | |
| 4,919,399 A | 4/1990 | Selzer et al. | |
| 5,133,573 A | 7/1992 | Kijima et al. | |
| 5,271,638 A | 12/1993 | Yale | |
| 5,429,423 A | 7/1995 | Pollock et al. | |
| 5,476,251 A | 12/1995 | Moses et al. | |
| 5,560,641 A | 10/1996 | Vogler | |
| 5,588,660 A | 12/1996 | Paddison | |
| 5,634,655 A | 6/1997 | Chalin | |
| 5,741,027 A | 4/1998 | Stroh et al. | |
| 5,810,377 A | 9/1998 | Keeler et al. | |
| 5,865,452 A | 2/1999 | Chalin | |
| 5,873,581 A | 2/1999 | Yale | |
| 5,921,570 A | 7/1999 | Lie | |
| 6,032,967 A | 3/2000 | Ogoniek | |
| 6,073,946 A | 6/2000 | Richardson | |
| 6,082,750 A | 7/2000 | Merkler et al. | |
| 6,237,304 B1 | 5/2001 | Wycech | |
| 6,241,266 B1 | 6/2001 | Smith et al. | |
| 6,352,245 B1 | 3/2002 | Norden | |
| 6,394,473 B1 | 5/2002 | Platner | |
| 6,416,136 B1 | 7/2002 | Smith | |
| 6,491,314 B2 * | 12/2002 | Smith et al. | 280/124.116 |
| 6,508,482 B2 * | 1/2003 | Pierce et al. | 280/124.116 |
| 6,536,789 B2 | 3/2003 | Svensson et al. | |
| 6,609,764 B2 | 8/2003 | Dudding et al. | |
| 6,616,156 B1 | 9/2003 | Dudding | |
| 6,799,811 B1 | 10/2004 | Dauber et al. | |
| 6,805,369 B2 | 10/2004 | Galazin | |
| 6,808,192 B1 * | 10/2004 | Bol | 280/124.116 |
| 6,820,884 B2 | 11/2004 | McCann et al. | |
| 6,834,874 B1 | 12/2004 | Overby | |
| 7,131,652 B2 * | 11/2006 | Ramsey | 280/86.5 |
| 7,328,908 B2 | 2/2008 | Barber et al. | |
| 7,360,773 B2 | 4/2008 | Gottschalk | |
| 7,360,774 B2 * | 4/2008 | Saieg et al. | 280/124.128 |
| 7,445,220 B2 * | 11/2008 | von Mayenburg et al. | 280/124.116 |
| 7,464,948 B2 * | 12/2008 | Ramsey | 280/124.107 |
| 7,484,745 B2 * | 2/2009 | Soles et al. | 280/124.116 |
| 7,748,726 B2 | 7/2010 | Dudding | |
| 2002/0096854 A1 | 7/2002 | Martinez | |
| 2004/0080135 A1 | 4/2004 | Dudding et al. | |
| 2004/0104553 A1 | 6/2004 | Richardson | |
| 2005/0168057 A1 | 8/2005 | Eschenburg | |
| 2005/0218620 A1 | 10/2005 | Reineck | |
| 2006/0113739 A1 | 6/2006 | Spetz et al. | |
| 2006/0244232 A1 | 11/2006 | Cortez et al. | |
| 2006/0244236 A1 * | 11/2006 | Cortez et al. | 280/124.175 |
| 2008/0018070 A1 | 1/2008 | Gottschalk | |
| 2008/0067771 A1 * | 3/2008 | Varela et al. | 280/124.116 |
| 2008/0238015 A1 | 10/2008 | Duddling et al. | |
| 2008/0252031 A1 | 10/2008 | Dudding | |

FOREIGN PATENT DOCUMENTS

| | | |
|---|---|---|
| EP | 1145878 A2 | 10/2001 |
| EP | 1270282 A2 | 1/2003 |
| JP | 9002033 A | 1/1997 |
| JP | 2000108632 A | 4/2000 |

OTHER PUBLICATIONS

Hendrickson USA, L.L.C., Composolite FX—Fixed-axle suspension system, circa 2006.
United States Patent and Trademark Office, Office Action dated Jan. 25, 2007 for U.S. Appl. No. 11/115,949.
United States Patent and Trademark Office, Office Action dated Dec. 24, 2009 for U.S. Appl. No. 11/734,671.
United States Patent and Trademark Office, Office Action dated Jun. 3, 2009 for U.S. Appl. No. 11/693,362.
United States Patent and Trademark Office, Office Action dated Oct. 22, 2010 for U.S. Appl. No. 11/919,534.
United States Patent and Trademark Office, Office Action dated Apr. 25, 2011 for U.S. Appl. No. 11/919,534.
International Search Report for PCT Appln. No. PCT/US06/15836, dated Apr. 20, 2007.
International Preliminary Report on Patentability for PCT Appln. No. PCT/US06/15836, dated Oct. 30, 2007.
European Search Report for European Patent Appln. No. 06751505.6, dated Oct. 27, 2010.
International Preliminary Report on Patentability for PCT Appln. No. PCT/US08/58353, dated Oct. 13, 2009.
European Search Report for European Patent Appln. No. 08799722.7, dated Nov. 19, 2010.
International Search Report for PCT Appln. No. PCT/US08/58357, dated Aug. 20, 2008.
European Search Report for European Patent Appln. No. 08732894.4, dated Mar. 11, 2011.
Office Action from Instituto Mexicano de la Propiedad Industrial for Mexican Patent Appln. No. MX/a/2007/013292, dated Oct. 27, 2010, and partial translation.
Office Action from Instituto Mexicano de la Propiedad Industrial for Mexican Patent Appln. No. MX/a/2007/013292, dated May 3, 2011, and partial translation.
Examination Report for New Zealand Patent Appln. No. 562924, dated Aug. 6, 2009.
Notification of the First Office Action for Chinese Patent Appln. No. 200880010747.8, dated Jan. 11, 2011, and translation.
Notification of the First Office Action for Chinese Patent Appln. No. 200680016894.7, dated Feb. 6, 2009, and translation.
Notification of the Second Office Action for Chinese Patent Appln. No. 200680016894.7, dated Jul. 17, 2009, and translation.
Notification of the Third Office Action for Chinese Patent Appln. No. 200680016894.7, dated Nov. 6, 2009, and translation.
Notification of the First Office Action for Chinese Patent Appln. No. 200880011799.7, dated Sep. 30, 2010, and translation.
Notification of the First Office Action for Chinese Patent Appln. No. 201010241572.0, dated Feb. 11, 2011, and translation.

* cited by examiner

LEADING AND TRAILING ARM SUSPENSIONS HAVING A FULLY INTEGRATED ARM

CROSS-REFERENCE TO RELATED APPLICATION

This application is a continuation of U.S. patent application Ser. No. 11/693,362, filed Mar. 29, 2007. The full disclosure of U.S. patent application Ser. No. 11/693,362 is hereby incorporated herein by reference.

DESCRIPTION

BACKGROUND OF THE INVENTION

The present invention is generally directed to leading arm and trailing arm vehicle suspension system types. More specifically, the present invention is directed to suspension systems having a longitudinally extending beam connecting a fabricated hollow vehicle axle to a vehicle frame hanger.

Leading and trailing arm vehicle suspension systems are known. Such suspensions typically have a longitudinally extending beam or arm that is pivotally connected at a proximal end to a vehicle frame hanger and generally rigidly connected at a distal end to a vehicle axle, typically through an axle seat or other intermediate suspension component. The beam or arm typically provides a bending stiffness to control axle windup and longitudinal stiffness to control axle position. As used herein, the terms beam and arm may be used interchangeably but shall be construed to exhibit the characteristics expressed within this paragraph.

Leading arm vehicle suspension systems are those types of suspensions wherein the vehicle axle is positioned forward of the frame hanger. Such suspensions typically are used on front steering axles in vehicles. Trailing arm vehicle suspension systems are those types of suspensions wherein the vehicle axle is positioned rearward of the frame hanger. Such suspensions are typically used on rear drive axles in vehicles.

While prior leading and trailing arm vehicle suspension systems have been adequate for certain purposes, they have lacked some of the advantages obtainable with the embodiments of the present invention. Many of these advantages are clearly described herein and others shall be readily apparent to those skilled in the art.

One advantage achieved by the present invention is the use of a leading or trailing arm beam in a leading or trailing arm suspension system wherein the beam is attached directly to a fabricated vehicle axle having a hollow, box-like cross-section by a durable thru-bolt connection.

Another advantage achieved by the present invention is the use of such a beam constructed to permit rack and pinion mounting thereto and having rack and pinion attachment holes machined through the beam.

Another advantage achieved by the present invention is the use of such a beam constructed to permit transverse torque rod bracket mounting thereto and having a torque rod bracket attachment hole machined through the beam.

Another advantage achieved by the present invention is the use of such a beam constructed to include a transverse torque rod attachment included in the beam casting.

Another advantage achieved by the present invention is the use of such a beam constructed to permit shock absorber mounting thereto and having a shock absorber attachment hole machined through the beam.

Another advantage achieved by the present invention is the use of such a beam constructed to permit air spring mounting thereto and having an air spring attachment hole machined through the beam.

Another advantage achieved by the present invention is use of such a beam to reduce suspension system weight, part count, assembly time and assembly complexity.

Another advantage achieved by the present invention is the use of such a beam to reduce failure modes and improve product integrity.

Another advantage achieved by the present invention is the ability to tune roll stiffness of the suspension by optimizing the compliance of the beam and the bushings used to connect the beam to its associated vehicle frame hanger.

These and other advantages of the preferred forms of the invention will become apparent from the following description. It will be understood, however, that an apparatus could still appropriate the invention claimed herein without exhibiting each and every one of these advantages, including those gleaned from the following description. The appended claims, not any advantages recited or implied herein, define the subject matter of this invention. Any and all advantages are derived from the preferred forms of the invention, not necessarily the invention in general.

SUMMARY OF THE INVENTION

The present invention is directed to a trailing or leading arm vehicle suspension system. A vehicle axle extends laterally across a vehicle centerline. The vehicle axle has a hollow section and further has a sleeve extending from a first wall of the section to a second wall of the section. A beam is attached to the vehicle axle and extends generally transverse to the direction thereof. The beam is press-fit onto said axle and wraps around said axle. The beam has a first bore aligned with the sleeve and positioned adjacent to the first wall of the section and a second bore aligned with the sleeve and positioned adjacent to the second wall of the section. A bolt extends through the first bore of the beam, the sleeve of the vehicle axle, and the second bore of the beam to fasten the beam to the vehicle axle.

The present invention is also directed to such a vehicle suspension system having a beam with rack and pinion attachment mounting holes.

In addition, other built-in features are available with the present invention.

DETAILED DESCRIPTION OF THE DRAWINGS

In the following detailed description, reference will frequently be made to the following drawing, in which like reference numerals refer to like components, and in which.

DETAILED DESCRIPTION OF THE PREFERRED EMBODIMENTS

Figure 1:
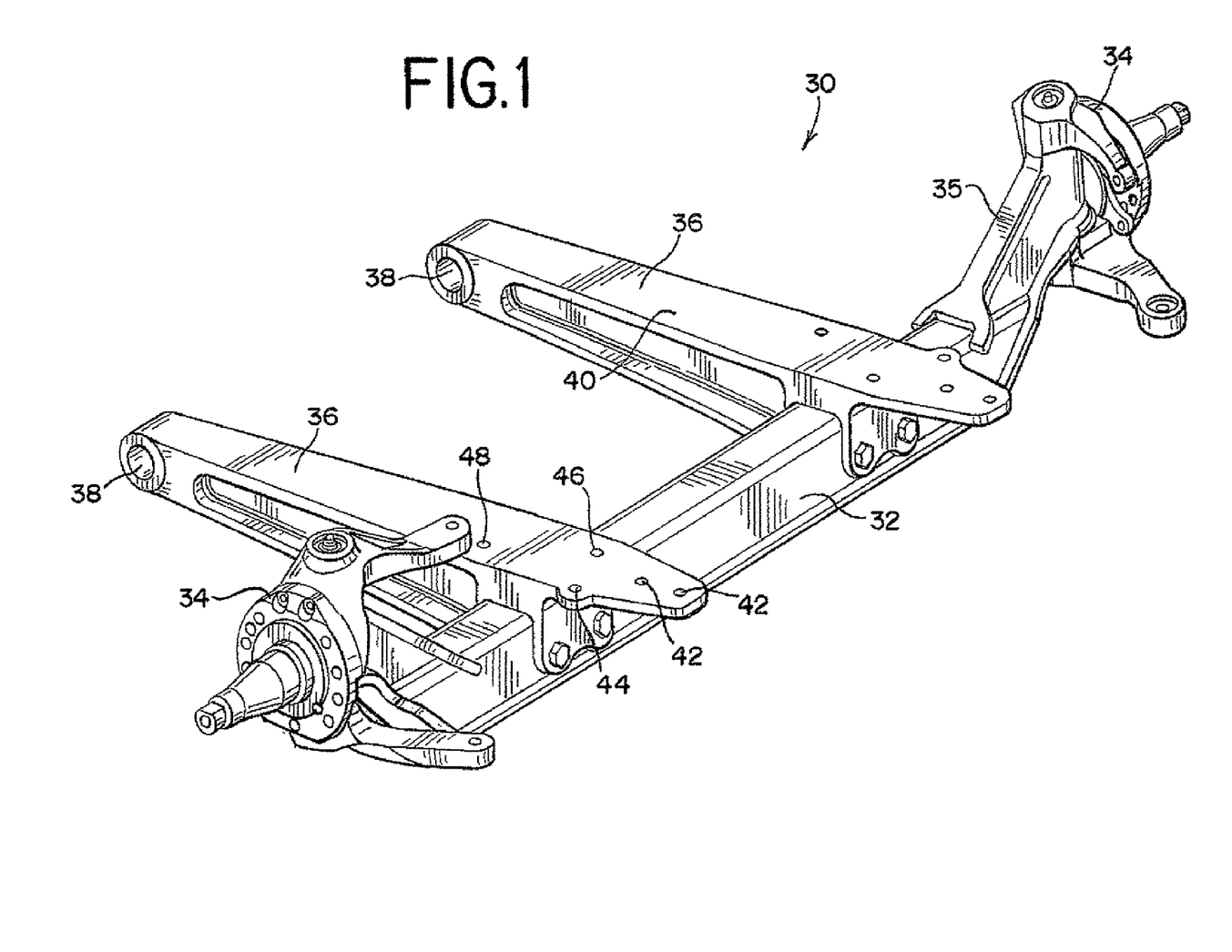
FIG. 1 is a perspective view of a trailing arm suspension system constructed in accordance with the principles of the present invention.

FIGS. 1-5 illustrate certain vehicle components for a vehicle having a trailing arm type suspension 30. A fabricated vehicle axle 32 is illustrated in FIG. 1. Fabricated vehicle axle 32 extends generally laterally across the vehicle centerline from one side to the other. Attached on opposite ends of fabricated vehicle axle 32 is a pair of cooperating steering knuckles 34. Steering knuckles 34 are pivotally attached to the respective gooseneck ends 35 of fabricated vehicle axle 32 by king pins (not shown) in known manner. For further information concerning details regarding fabricated vehicle axle 32 and steering knuckles 34, the reader may review U.S. Pat. No. 6,609,764 (Dudding et al.) and U.S. Pat. No. 6,616,156 (Dudding et al.). Having been fully described in these two patent publications, the details of fabricated vehicle axle 32 and steering knuckles 34 are available to and known by those skilled in the art, and it is unnecessary to recite such details herein. Nonetheless, U.S. Pat. No. 6,609,764 (Dudding et al.) is hereby incorporated herein by reference. Similarly, U.S. Pat. No. 6,616,156 (Dudding) is hereby incorporated herein by reference. The fabricated vehicle axle 32 has a box section to provide high roll stability.

FIG. 1 also illustrates two longitudinally extending beams 36 press-fit onto and bolted through fabricated vehicle axle 32. Beams 36 are preferably either aluminum or ductile iron castings and are fully integrated structures that glove over the fabricated vehicle axle 32. This construction is very efficient with regard to cost and weight, as well as ease of manufacture. Each beam 36 includes a bushing receiving bore 38 at its proximal end for receiving a bushing and connecting the beam to a vehicle frame hanger. Each beam 36 extends longitudinally rearward in the trailing configuration from the vehicle frame hanger to and beyond the fabricated vehicle axle 32. As each beam 36 so extends, it has a uniform width for an initial segment of the beam and then, at a point, begins to widen gradually and continuously to a generally maximum width proximal of the fabricated vehicle axle. As the beam extends beyond the fabricated vehicle axle, it is a plate-like structure. In such structure, there is an outboard projection on each beam 36 and then the width thereof tapers down to its minimum dimension. Those skilled in the art will understand that different shapes for beams 36 may be used, as desired. Beams 36 provide a bending stiffness to control axle windup and longitudinal stiffness to control axle position.

Each beam 36 includes a generally planar top surface 40 machined to include a pair of rack and pinion mounting holes 42, a shock absorber mounting hole 44 positioned within the aforementioned outboard projection, an air spring mounting hole 46 and a transverse torque rod bracket mounting hole 48. These built-in features permit each of the loads associated with the attached suspension components to be transferred efficiently into the fabricated vehicle axle 32. The rack and pinion mounting holes 42 provide precise mounting for the vehicle rack and pinion steering system.

Figure 2:
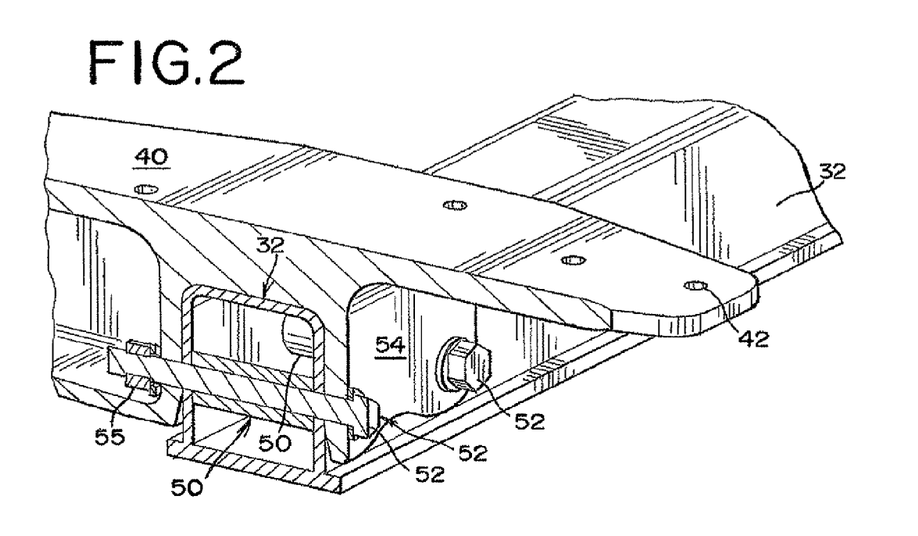
FIG. 2 is a sectional view of a portion of the suspension system shown in FIG. 1.

FIG. 2 illustrates the thru-bolt connection of a beam 36 to fabricated vehicle axle 32. As shown, fabricated vehicle axle 32 includes the known bottom plate having an inverted U-shaped member welded thereto. Within the inverted U-shaped member, fabricated vehicle axle 32 includes sleeves 50 designed to accommodate the shafts of bolts 52 in a generally snug fitting relationship. As each beam 36 wraps around the inverted U-shaped member of fabricated vehicle axle 32, it includes a wrap plate 54 on the distal side of the axle. Wrap plate 54 includes two bores, which are brought into registration with the sleeves 50 extending through the inverted U-shaped member of fabricated vehicle axle 32. The bolts 52 are inserted through the bores within wrap plate 54, through sleeves 50 and through bores machined into the bearing surfaces formed on the proximal end of the axle wrap portion. The longitudinally extending grooves on the inboard and outboard sides of beam 36 form such bearing surfaces, thereby allowing nuts 55 to be fastened to bolts 52.

Figure 3:
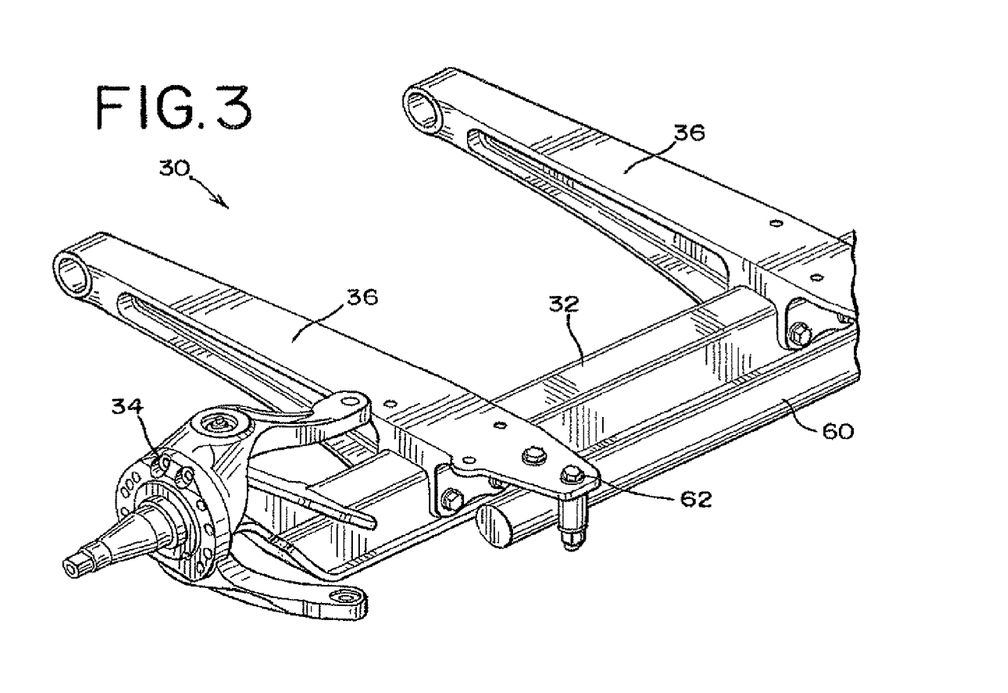
FIG. 3 is another perspective view of the suspension system shown in FIG. 1.

FIG. 3 illustrates a rack and pinion steering system 60 attached to beams 36. In the illustrated embodiment, the rack and pinion steering system 60 is attached by the use of fasteners 62 securing the rack and pinion system to rack and pinion mounting holes 42 of the beams.

Figure 4:
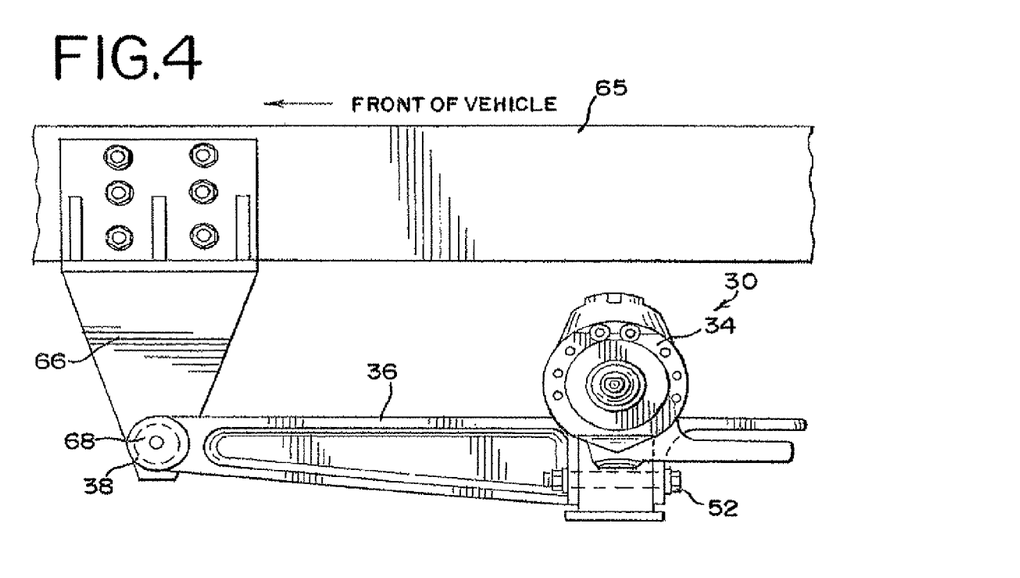
FIG. 4 is a first side elevational view of the suspension system shown in FIG. 1.
Figure 5:
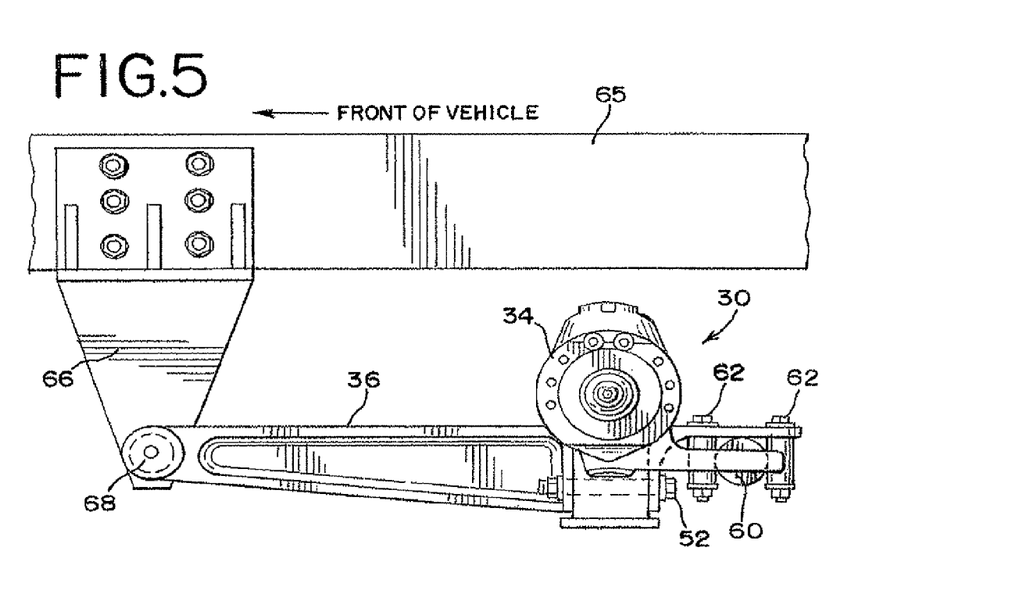
FIG. 5 is a second side elevational view of the suspension system shown in FIG. 1.

FIGS. 4 and 5 illustrate the trailing arm suspension 30 connected to vehicle frame rails 65 having a known construction and extending longitudinally along each side of the vehicle. Each frame rail 65 includes a frame hanger 66 attached thereto and extending downward a predetermined distance to permit beam 36 to be attached thereto. In particular, a bushing 68 inserted within bushing receiving bore 38 of beam 36 provides for the attachment of the beam to frame hanger 66. FIG. 4 illustrates a trailing arm configuration wherein a rack and pinion steering system is not mounted to the beam, while FIG. 5 illustrates the same configuration but with a rack and pinion steering system mounted to the beam in the manner illustrated in FIG. 3.

Figure 6:
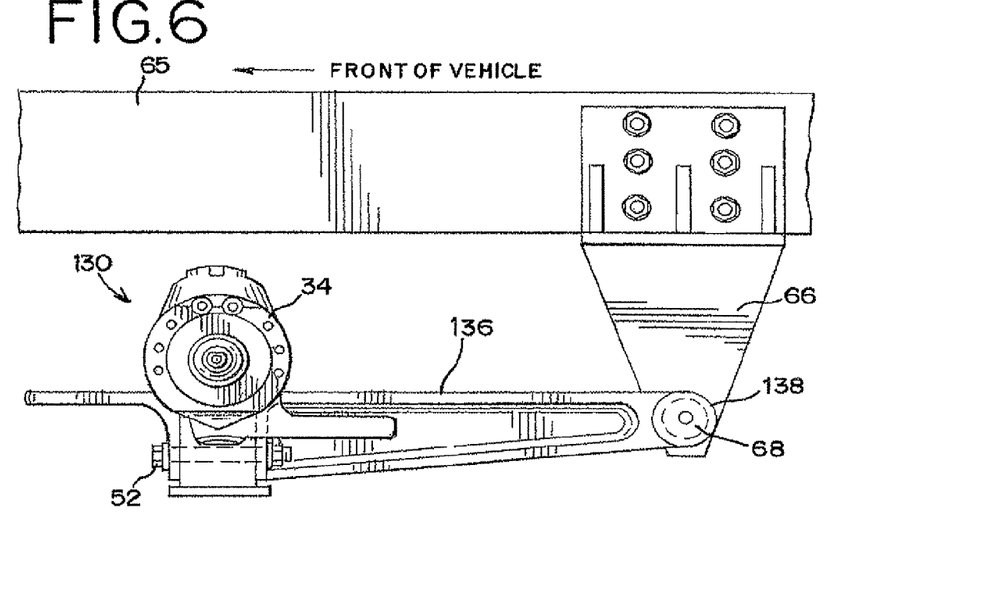
FIG. 6 is a first side elevational view of a leading arm suspension system constructed in accordance with the principles of the present invention.
Figure 7:
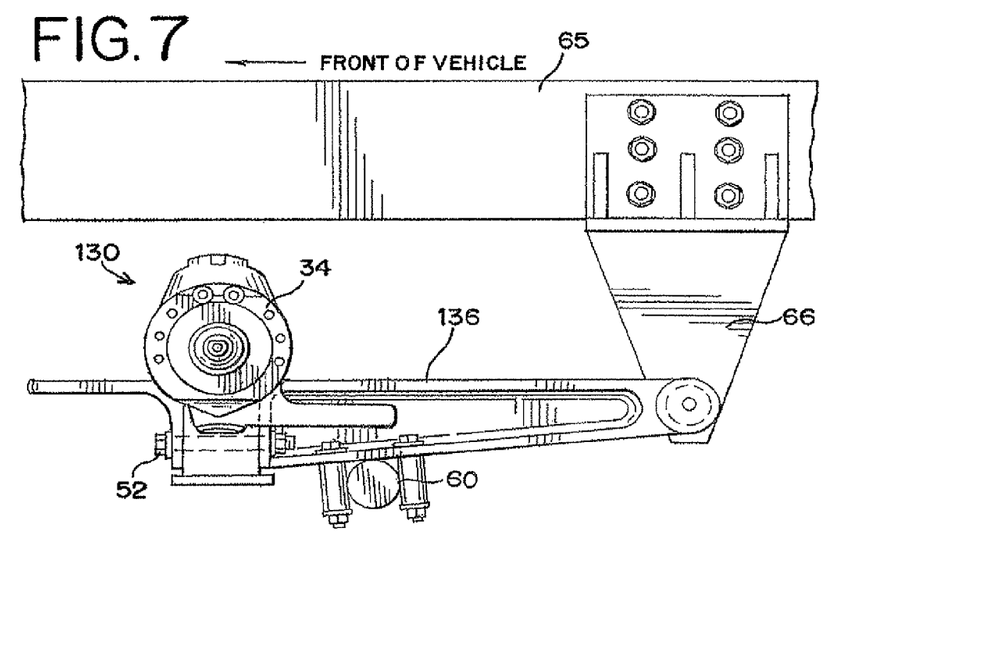
FIG. 7 is a second side elevational view of the suspension system shown in FIG. 6.

FIGS. 6-10 illustrate certain vehicle components for a vehicle having a leading arm type suspension 130. FIGS. 6 and 7 illustrate the leading arm suspension 130 connected to vehicle frame rails 65 through frame hanger 66 attached thereto. Bushing 68 is inserted within bushing receiving bore 138 of beam 136 to provide for the attachment of the beam to frame hanger 66. FIG. 6 illustrates a leading arm configuration wherein a rack and pinion steering system is not mounted to beam 136, while FIG. 7 illustrates the same configuration but with a rack and pinion steering system 60 mounted to the beam.

Figure 8:
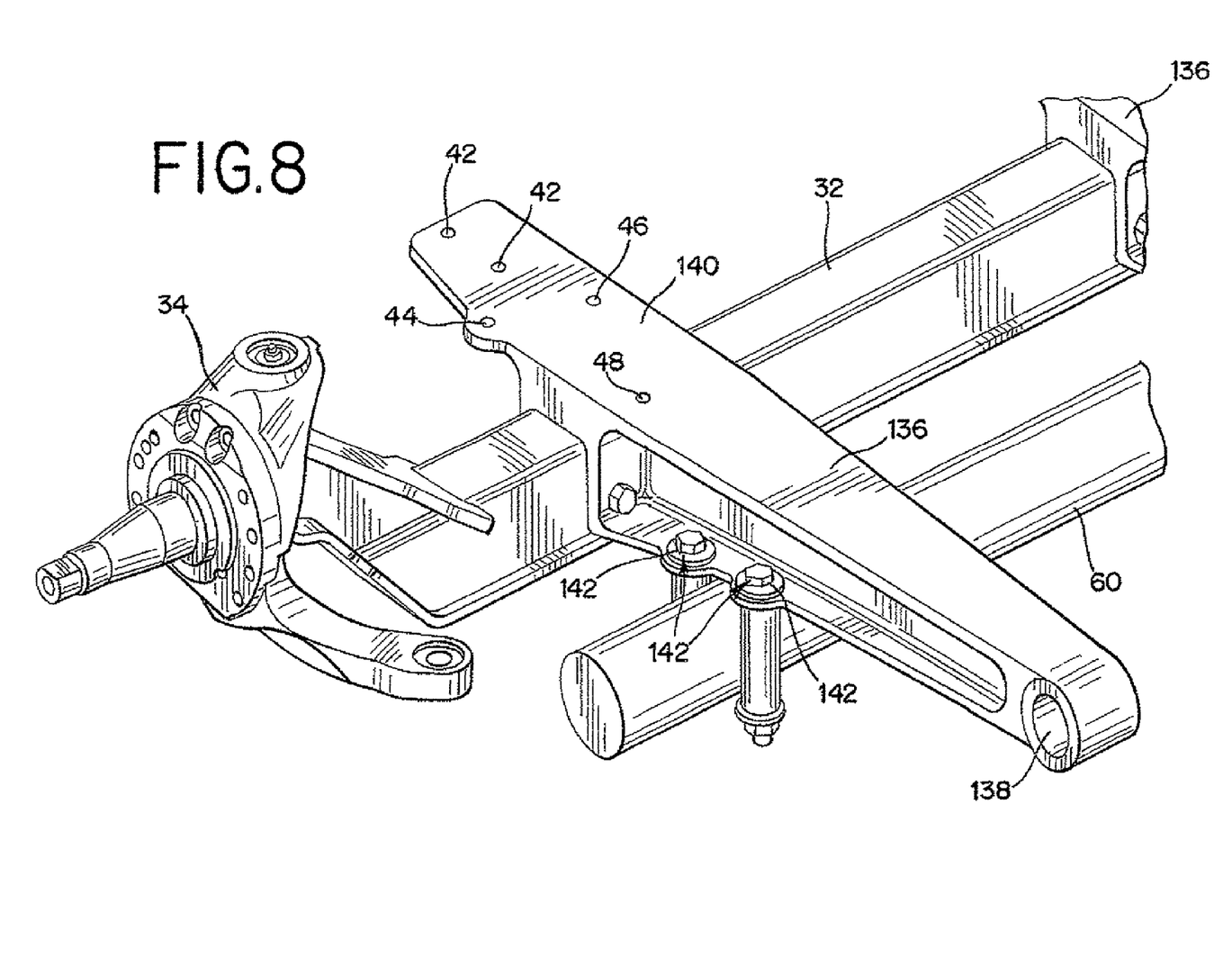
FIG. 8 is a perspective view of the suspension system shown in FIG. 7.

FIG. 8 illustrates the fabricated vehicle axle 32 extending laterally across the vehicle and having steering knuckles 34 pivotally attached to its ends. Two longitudinally extending beams 136 are press fit onto and bolted through fabricated vehicle axle 32. Each beam 136 includes a bushing receiving bore 138 at its proximal end. Each beam 136 extends longitudinally forward in the leading configuration from the vehicle frame hanger to and beyond the fabricated vehicle axle 32. Those skilled in the art will understand that different shapes for beams 136 may be used, as desired, besides the illustrated shape. Beams 136 provide a bending stiffness to control axle windup and longitudinal stiffness to control axle position.

Rack and pinion mounting holes 142 are included within a lower flange of the portion of beam 136 extending between the frame hanger and the fabricated vehicle axle. As such, the rack and pinion steering system 60 is fastened to beam 136 between the frame hanger and axle in this embodiment, as shown, with rack and pinion mounting bolts. The rack and pinion mounting holes 142 provide precise mounting for the vehicle rack and pinion steering system. It will be appreciated that this construction could also be used in a trailing arm configuration. Similarly, the corresponding construction for mounting of the rack and pinion steering system illustrated in FIGS. 1-5 could be used in a leading arm configuration and rack and pinion mounting holes 42 illustrated in FIG. 8 could be used.

Each beam 136 also includes a generally planar top surface 140 machined to have a shock absorber mounting hole 44, an air spring mounting hole 46 and a transverse torque rod bracket mounting hole 48. Beam 136 also has the same bolt-thru attachment to fabricated vehicle axle 32 illustrated in and described with reference to FIG. 2.

Figure 9:
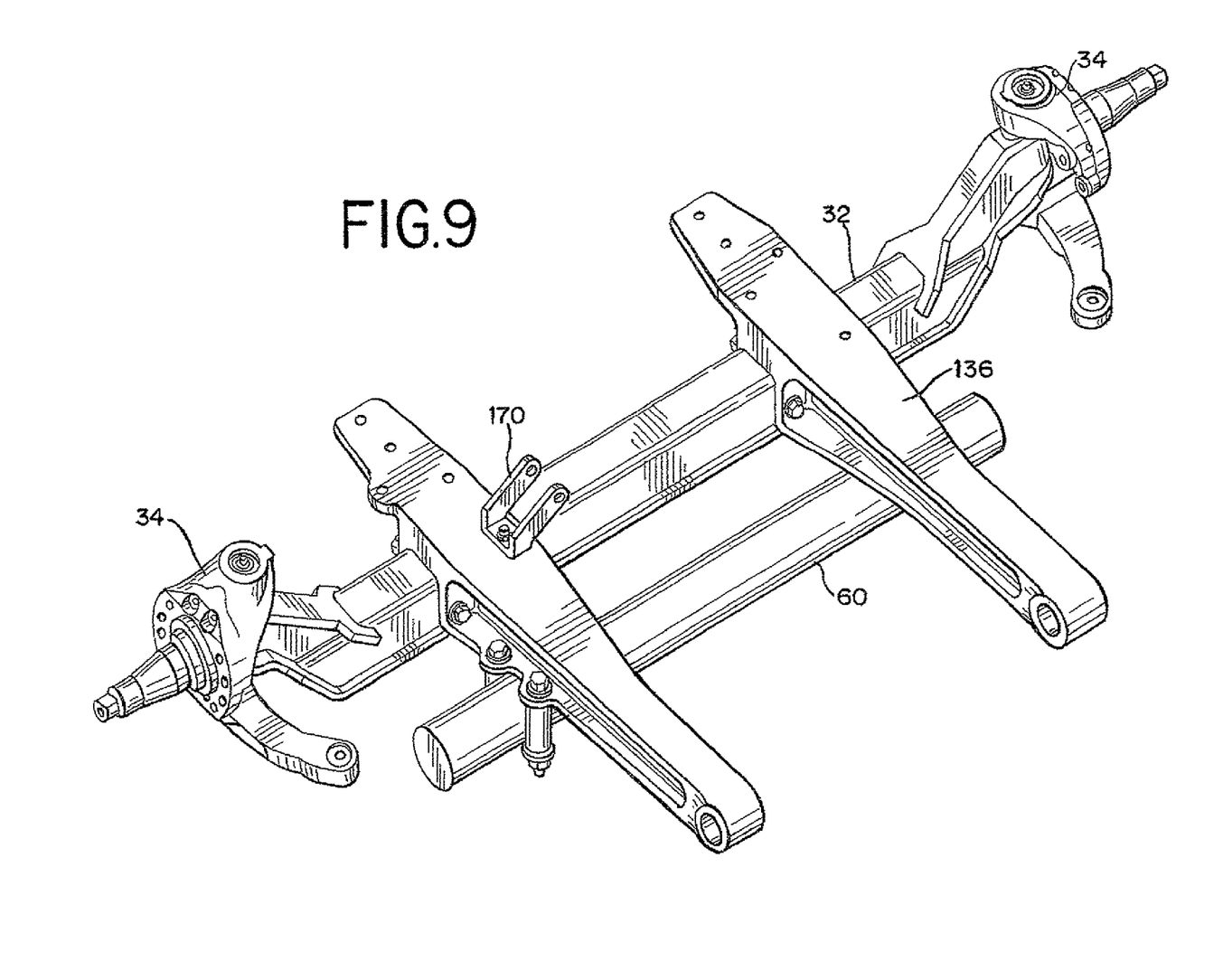
FIG. 9 is a perspective view of the suspension system shown in FIG. 7 and showing additional components.

FIG. 9 illustrates a beam 136 having a transverse torque rod bracket 170 fastened thereto. In a common configuration, transverse torque rod bracket 170 has two cooperating projecting ears, each having a bore machined through it. The bores are coaxially aligned to permit attachment of the vehicle torque rod (not shown).

Figure 10:
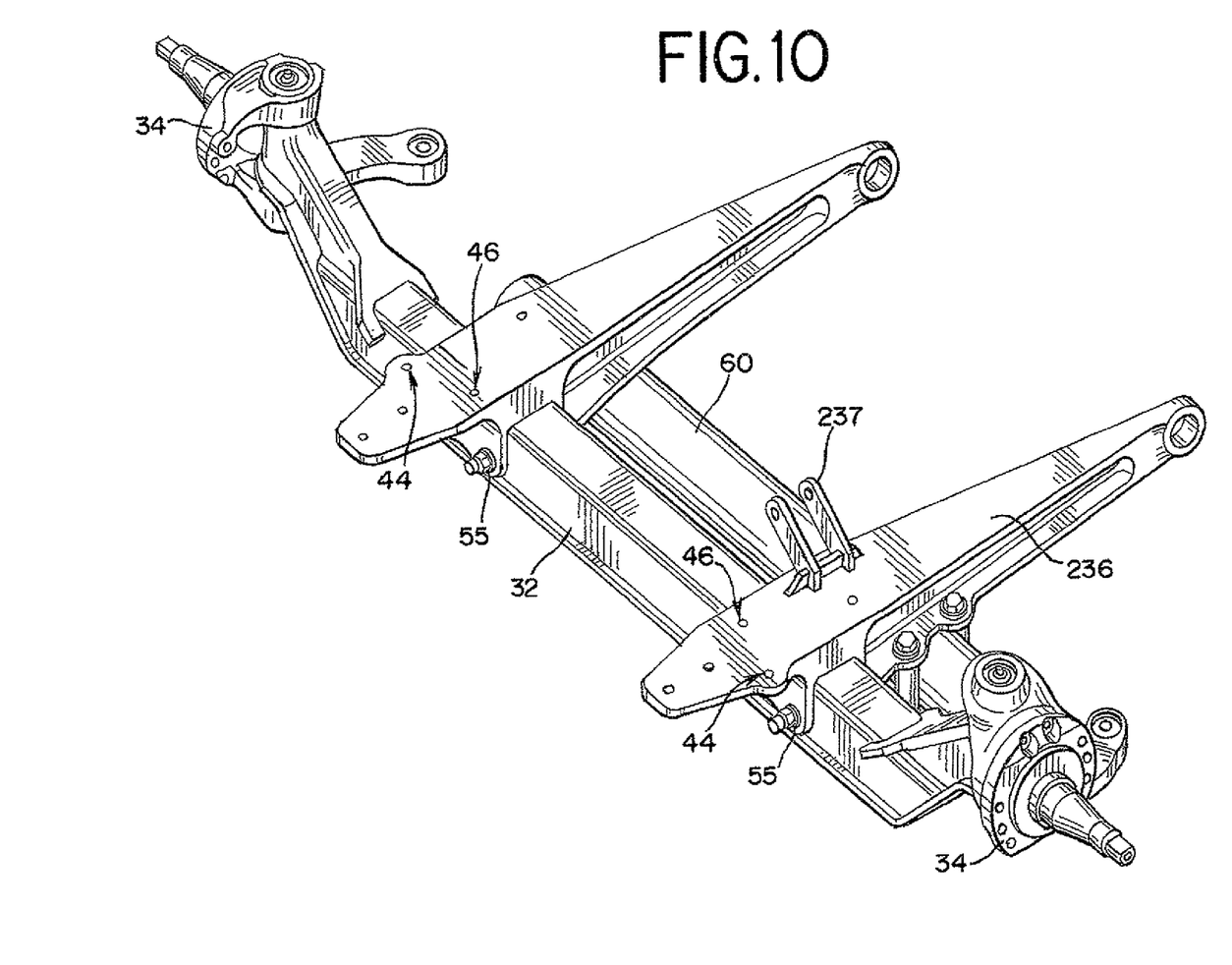
FIG. 10 is a perspective view of the suspension system shown in FIG. 7 and showing a modified component.

FIG. 10 illustrates a beam 236 having a transverse torque rod attachment 237 included in the beam casting. This attachment has similar projecting ears as the bracket illustrated in FIG. 9. It will be appreciated that the bracket illustrated in FIG. 9 and the attachment illustrated in FIG. 10 could be used in a trailing arm configuration.

While this invention has been described with reference to several illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

The invention claimed is:

1. A trailing or leading arm vehicle suspension system, comprising:
    a steering axle extending laterally across a vehicle centerline, said steering axle having a fabricated body construction that defines an elongated hollow section of said axle, and further constructed to have a sleeve extending from a first wall of said section to a second wall of said section;
    a beam attached to the vehicle axle and extending generally transverse to the direction of the vehicle axle, said beam being press-fit to said axle and wrapping around said axle, said beam having a first bore aligned with said sleeve and positioned adjacent to said first wall of said section and a second bore aligned with said sleeve and positioned adjacent to said second wall of said section;
    a bolt extending through said first bore of said beam, said sleeve of said vehicle axle, and said second bore of said beam to fasten said beam to said vehicle axle.

2. The trailing or leading arm vehicle suspension system of claim 1 wherein said beam has rack and pinion attachment mounting holes.

3. The trailing or leading arm vehicle suspension system of claim 1 wherein said beam has a torque rod bracket attachment mounting hole.

4. The trailing or leading arm vehicle suspension system of claim 1 wherein said beam has a torque rod mount formed as part of the beam.

5. The trailing or leading arm vehicle suspension system of claim 1 wherein said beam has a shock absorber attachment mounting hole.

6. The trailing or leading arm vehicle suspension system of claim 1 wherein said beam has an air spring attachment mounting hole.

7. A trailing or leading arm vehicle suspension system, comprising:
    a steering axle having a fabricated body construction that defines an elongated hollow interior section that extends laterally across a vehicle centerline;
    a beam attached to the steering axle and extending generally transverse to the direction of the steering axle, said beam having steering system attachment mounting holes which are spaced away from said steering axle for direct connection of said steering system to said beam.

8. The trailing or leading arm vehicle suspension system of claim 7 wherein said beam has a torque rod bracket attachment mounting hole.

9. The trailing or leading arm vehicle suspension system of claim 7 wherein said beam has a torque rod mount formed as part of the beam.

10. The trailing or leading arm vehicle suspension system of claim 7 wherein said beam has a shock absorber attachment mounting hole for direct connection of said shock absorber to said beam.

11. The trailing or leading arm vehicle suspension system of claim 7 herein said beam has an air spring attachment mounting hole for direct connection of said air spring to said beam.

12. The trailing or leading arm vehicle suspension system of claim 7 wherein said steering system is a rack and pinion steering system.

13. A trailing or leading arm vehicle suspension system, comprising:
    a steering axle extending laterally across a vehicle centerline, said steering axle having a fabricated body construction that defines a hollow section of said axle, and further constructed to have oppositely disposed first and second walls in said section;
    a beam attached to the steering axle and extending generally transverse to the direction of the steering axle, said beam being press-fit to said axle and wrapping around said axle, said beam having a first bore in said first wall and a second bore in said second wall of said section, said first and second bores being in alignment with each other;
    a bolt extending through said first and second bores of said beam to fasten said beam to said vehicle axle.

14. The trailing or leading arm vehicle suspension system of claim 13 wherein said beam has rack and pinion attachment mounting holes.

15. The trailing or leading arm vehicle suspension system of claim 13 wherein said beam has a torque rod bracket attachment mounting hole.

16. The trailing or leading arm vehicle suspension system of claim 13 wherein said beam has a torque rod mount formed as part of the beam.

17. The trailing or leading arm vehicle suspension system of claim 13 wherein said beam has a shock absorber attachment mounting hole.

18. The trailing or leading arm vehicle suspension system of claim 13 wherein said beam has an air spring attachment mounting hole.

\* \* \* \* \*